(12) United States Patent
Clothier et al.

(10) Patent No.: US 7,701,164 B2
(45) Date of Patent: Apr. 20, 2010

(54) CONTROL OF ELECTRICAL MACHINES

(75) Inventors: Andrew Charlton Clothier, Hullavington (GB); Stephen Greetham, Charfield (GB); Hanping Dai, Chippenham (GB)

(73) Assignee: Dyson Technology Limited, Malmesbury (GB)

( * ) Notice: Subject to any disclaimer, the term of this patent is extended or adjusted under 35 U.S.C. 154(b) by 577 days.

(21) Appl. No.: 10/588,281

(22) PCT Filed: Jan. 27, 2005

(86) PCT No.: PCT/GB2005/000296

§ 371 (c)(1),
(2), (4) Date: Mar. 14, 2007

(87) PCT Pub. No.: WO2005/076459

PCT Pub. Date: Aug. 18, 2005

(65) Prior Publication Data

US 2007/0278983 A1 Dec. 6, 2007

(30) Foreign Application Priority Data

Feb. 5, 2004 (GB) ................................. 0402528.4

(51) Int. Cl.
*H02P 23/00* (2006.01)
*H02P 6/00* (2006.01)

(52) U.S. Cl. .................. 318/701; 318/717; 318/723

(58) Field of Classification Search ............. 318/701, 318/727, 400.03, 807, 696, 717, 723; 388/805, 388/815; 363/48
See application file for complete search history.

(56) References Cited

U.S. PATENT DOCUMENTS

| 4,168,455 | A |   | 9/1979 | Soeda et al. |
| 4,611,157 | A |   | 9/1986 | Miller et al. |
| 4,772,839 | A |   | 9/1988 | MacMinn et al. |
| 5,012,172 | A | * | 4/1991 | Sember ...................... 318/696 |
| 5,206,575 | A | * | 4/1993 | Nakamura et al. .......... 318/807 |
| 5,450,306 | A | * | 9/1995 | Garces et al. ................. 363/41 |
| 5,640,073 | A | * | 6/1997 | Ikeda et al. ............ 318/400.03 |
| 5,724,477 | A | * | 3/1998 | Webster et al. ............... 388/815 |
| 5,903,128 | A | * | 5/1999 | Sakakibara et al. ......... 318/721 |
| 6,072,302 | A | * | 6/2000 | Underwood et al. .......... 322/17 |

(Continued)

FOREIGN PATENT DOCUMENTS

GB 0229873.5 12/2002

(Continued)

*Primary Examiner*—Paul Ip
(74) *Attorney, Agent, or Firm*—Morrison & Foerster LLP

(57) ABSTRACT

An electrical machine, such as a switched reluctance motor, has a rotor and a controller arranged to energize at least one electrically energizable phase winding in dependence on the angular position of the rotor. The controller may employ a control law table derived by applying a predetermined DC link voltage to the windings. Differences between an applied DC link voltage and the predetermined DC link voltage may be compensated by applying a predetermined correction to the angular position of energization of the phase winding in dependence on the value applied DC link voltage. Such a compensation factor may be derived from a relationship held in memory.

16 Claims, 10 Drawing Sheets

U.S. PATENT DOCUMENTS

| | | | |
|---|---|---|---|
| 6,084,786 A * | 7/2000 | Rozman | 363/48 |
| 6,128,204 A * | 10/2000 | Munro et al. | 363/41 |
| 6,222,335 B1 | 4/2001 | Hiti et al. | |
| 6,313,597 B1 * | 11/2001 | Elliott et al. | 318/701 |
| 6,316,918 B1 * | 11/2001 | Underwood et al. | 322/20 |
| 6,380,719 B2 * | 4/2002 | Underwood et al. | 322/36 |
| 6,545,443 B2 * | 4/2003 | Kushida | 318/727 |
| 6,586,904 B2 * | 7/2003 | McClelland et al. | 318/701 |
| 6,642,681 B2 * | 11/2003 | Kawabata et al. | 318/431 |
| 6,759,826 B2 * | 7/2004 | Tankard | 318/701 |
| 6,819,008 B2 * | 11/2004 | Kaplan et al. | 290/44 |
| 7,102,903 B2 * | 9/2006 | Nakamura et al. | 363/98 |
| 7,109,605 B2 * | 9/2006 | Habu | 307/39 |
| 7,233,873 B2 * | 6/2007 | Moriarty et al. | 702/94 |
| RE40,250 E * | 4/2008 | Kushida | 318/727 |
| 7,443,125 B2 * | 10/2008 | Clothier et al. | 318/701 |
| 2002/0117989 A1 * | 8/2002 | Kawabata et al. | 318/700 |
| 2003/0067278 A1 * | 4/2003 | Nakamura et al. | 318/254 |
| 2006/0067655 A1 * | 3/2006 | Okuda et al. | 388/805 |

FOREIGN PATENT DOCUMENTS

| | | |
|---|---|---|
| JP | 2001-87189 | 4/2001 |
| JP | 2002-58279 | 2/2002 |
| JP | 2003-244981 | 8/2003 |
| JP | 2003-311077 | 11/2003 |

* cited by examiner

| | TORQUE LOCATIONS | | | | | | | | | N |
|---|---|---|---|---|---|---|---|---|---|---|
| | 0 | 1 | 2 | 3 | | | | | | |
| | 2 | $\theta_1, \theta_2$ | $\theta_3, \theta_4$ | | | | | | | $\theta_i, \theta_j$ |
| | 4 | | | | | | | | | |
| SPEED LOCATIONS (kRPM) | | | | | | | | | | |
| | 98 | | | | | | | | | |
| | 100 | | | | | | | | | $\theta_x, \theta_y$ |

*Fig. 2*
*(Prior Art)*

CONTROL OF ELECTRICAL MACHINES

FIELD OF THE INVENTION

This invention relates to controlling an electrical machine, particularly a machine of the switched reluctance type, such as a switched reluctance motor.

BACKGROUND OF THE INVENTION

Switched reluctance machines have become increasingly popular in recent years. In a switched reluctance motor, a stator has sets of poles that are sequentially energised to rotate a rotor into line with the energised pair of poles, under the influence of the magnetic fields associated with each set of poles. By rapidly switching between different pairs of poles, it is possible to cause the rotor to rotate at a very high speed.

Recent developments in switched reluctance motors have resulted in higher speeds of rotation of the rotor than was achievable hitherto. However, control of the rotor at such high speeds can be problematic. In particular, the angular position of the rotor at which the poles are energised and de-energised needs to be controlled carefully It has been proposed to employ control law tables, held in a memory associated with the control circuits of the machine. The control law tables typically comprise look-up tables relating the turn-on and turn-off angles to the speed and torque of the machine over a wide range of operating conditions. However, such control law tables are normally derived by assuming a constant value for the voltage applied to the windings, known as the DC link voltage. In practice, changes in the voltage of the mains power supply, as well as other electrical changes in the environment, result in a DC link voltage that varies over time.

Various proposals have been made to compensate for variance of the applied voltage. For example, in U.S. Pat. No. 6,586,904, it is proposed to sample the DC link voltage, the speed of rotation of the rotor and the torque produced by the motor. These measurements are then used to derive a compensated speed value and a compensated torque value. A look-up table is then employed in order to derive desired operating parameters based on these values.

SUMMARY OF THE INVENTION

The invention provides a method of compensating for differences between an applied DC link voltage and a predetermined DC link voltage in an electrical machine having a rotor, at least one phase winding and a controller arranged to energise the phase winding in dependence on the angular position of the rotor, the method comprising the steps of measuring the applied DC link voltage and applying a predetermined correction to the angular position of energisation of the phase winding in dependence on the value of the applied DC link voltage The invention permits control of an electrical machine in a more straightforward manner than was achievable hitherto, whilst also utilising less memory.

Preferably, a predetermined relationship between the applied DC link voltage and the correction to the angular position is stored in a memory associated with the controller.

The DC link voltage may be measured periodically and/or on starting the machine. The DC link voltage may also be measured when the machine is connected to a power supply, such as a mains supply, but before the machine is switched on.

The invention further comprises a controller for an electrical machine comprising a rotor and at least one phase winding, the controller being arranged to energise the phase winding in dependence on the angular position of the rotor, the controller further being arranged to apply, on application of a DC link voltage, a predetermined correction to the angular position of energisation of the phase winding in dependence on the value of the applied DC link voltage.

The controller may be incorporated in a variety of electrical machines, for example a cleaning appliance.

BRIEF DESCRIPTION OF THE DRAWINGS

The invention will now be described, by way of example, with reference to the accompanying drawings, in which:—

FIG. 2 shows a prior art control map for the motor of FIG. 1;

DETAILED DESCRIPTION OF THE INVENTION

Figure 1:
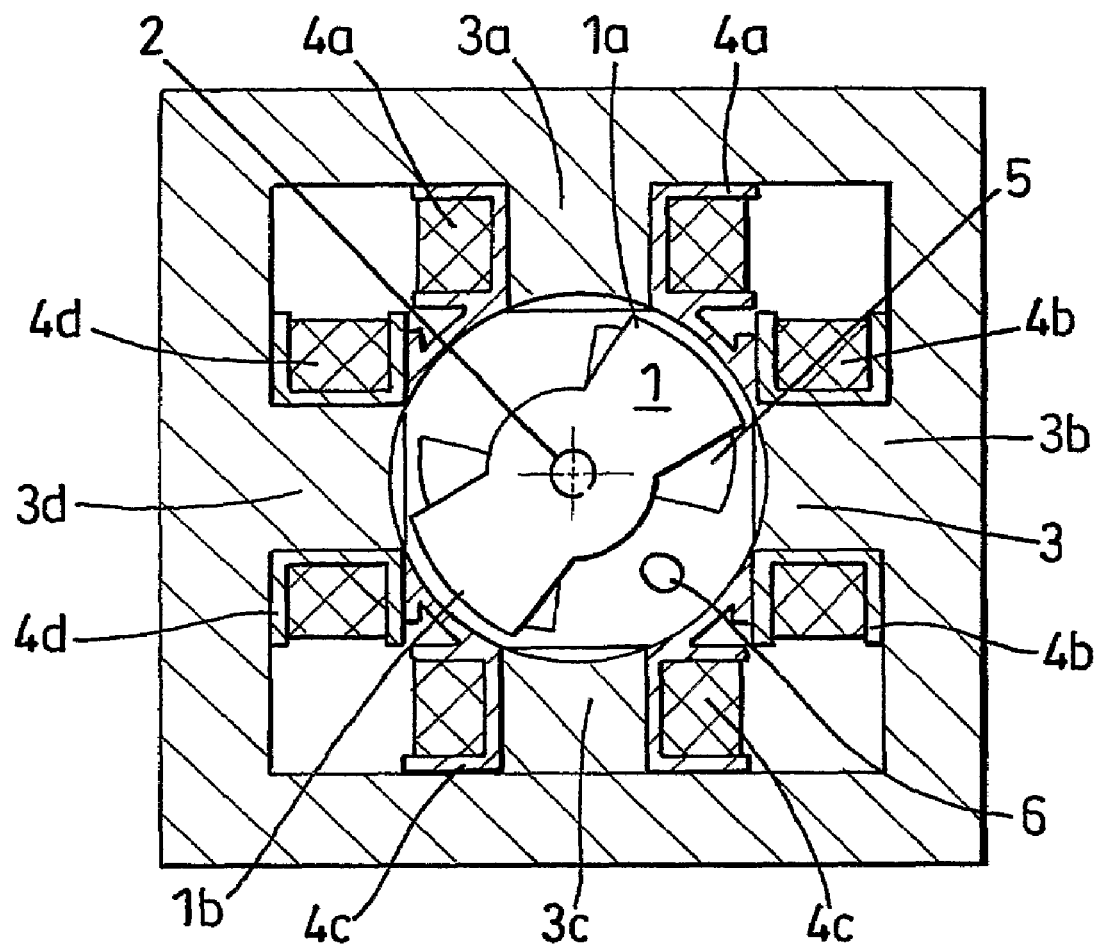
FIG. 1 schematically shows a typical switched reluctance motor.

Like reference numerals refer to like parts throughout the specification.

FIG. 1 is a cross-sectional view of a typical switched reluctance motor. It comprises a rotor 1, mounted on a shaft 2 and a stator 3. The rotor 1 comprises an axially laminated stack of steel plates, arranged to form a pair of poles 1a, 1b. The stator 3 comprises a stack of steel laminations arranged to have, in this example, four inwardly projecting salient poles 3a, 3b, 3c and 3d. Opposing poles 3a and 3c each support a winding 4a, 4b which together form a first phase. The other diametrically opposite poles 3b and 3d similarly accommodate respective windings 4c and 4d, which represent a second phase. Each winding 4 comprises a large number of turns (e.g. 50+ turns) of an insulated electrical conductor around the respective stator pole.

In use, energisation of the phase windings is controlled in order to effect rotation of the rotor. Thus, it is imperative that the rotational position of the rotor with respect to the phase windings is known. Thus, position detecting means are provided, in this case in the form of an encoder disk 5, source 6 of optical radiation and an optical sensor (not shown). The encoder disk 5 is positioned between the source 6 and detector, the plane of the disk being substantially perpendicular to the direction of optical radiation. Apertures in the disk allow light from the source to be transmitted to the sensor. As the encoder disk 5 rotates with the shaft 2 of the rotor assembly 1, light from the source is interrupted intermittently. Thus, the optical sensor receives a pulsed light signal. Signals from the optical sensor are transmitted to a controller.

At low speeds, it is relatively straightforward to control the application of voltage to the phase windings. Typically, this is done by means of pulse width modulation (PWM), which is discussed further below. However, as speed increases, the angular position of the rotor at which voltage is applied to the windings (the turn-on angle) must be advanced, as must the angular position at which the application of voltage is stopped (the turn-off angle). The turn-on angle must be advanced to allow the build-up of flux in the winding from zero to the desired value before the inductance starts rising as the poles approach. This is known as the on-advance angle. Similarly, the turn-off angle must be advanced to be able to reduce the flux to zero before inductance starts diminishing as the poles separate. This is known as the off-advance angle.

In a typical controller for a switched reluctance motor a control law map is employed in the form of a look-up table. An example of such a table is shown in FIG. 2. The table comprises a series of storage locations held in a memory. The table charts the relationship between the speed of the motor and the desired torque produced by the motor. In each location of the table are stored control parameters for controlling the machine to produce the corresponding speed and torque. Typically, the control parameters comprise the on-advance angle and the off-advance angle. During operation of the motor, the speed and motoring torque are measured and input to the control system, which employs the look-up table to find the appropriate firing angles to control energisation of the phase windings in order to achieve a desired speed and torque.

However, a drawback of this type of control map is that it occupies a large amount of memory. Furthermore, if the control map is applied in manufacture to a batch of motors, it is essential that those motors have the same performance characteristics in order to achieve consistent results. Therefore, the motors must be manufactured from components having consistent and defined tolerances, both physical and electrical. Naturally, this adds considerably to the overall cost of the motor. The alternative is to generate look-up tables from scratch for each motor, which proposal is extremely time-consuming and also costly.

Generating a Control Map

A control map overcoming this problem, and a method of generating the control map will now be described with reference to FIGS. 3 to 5.

Figure 3:
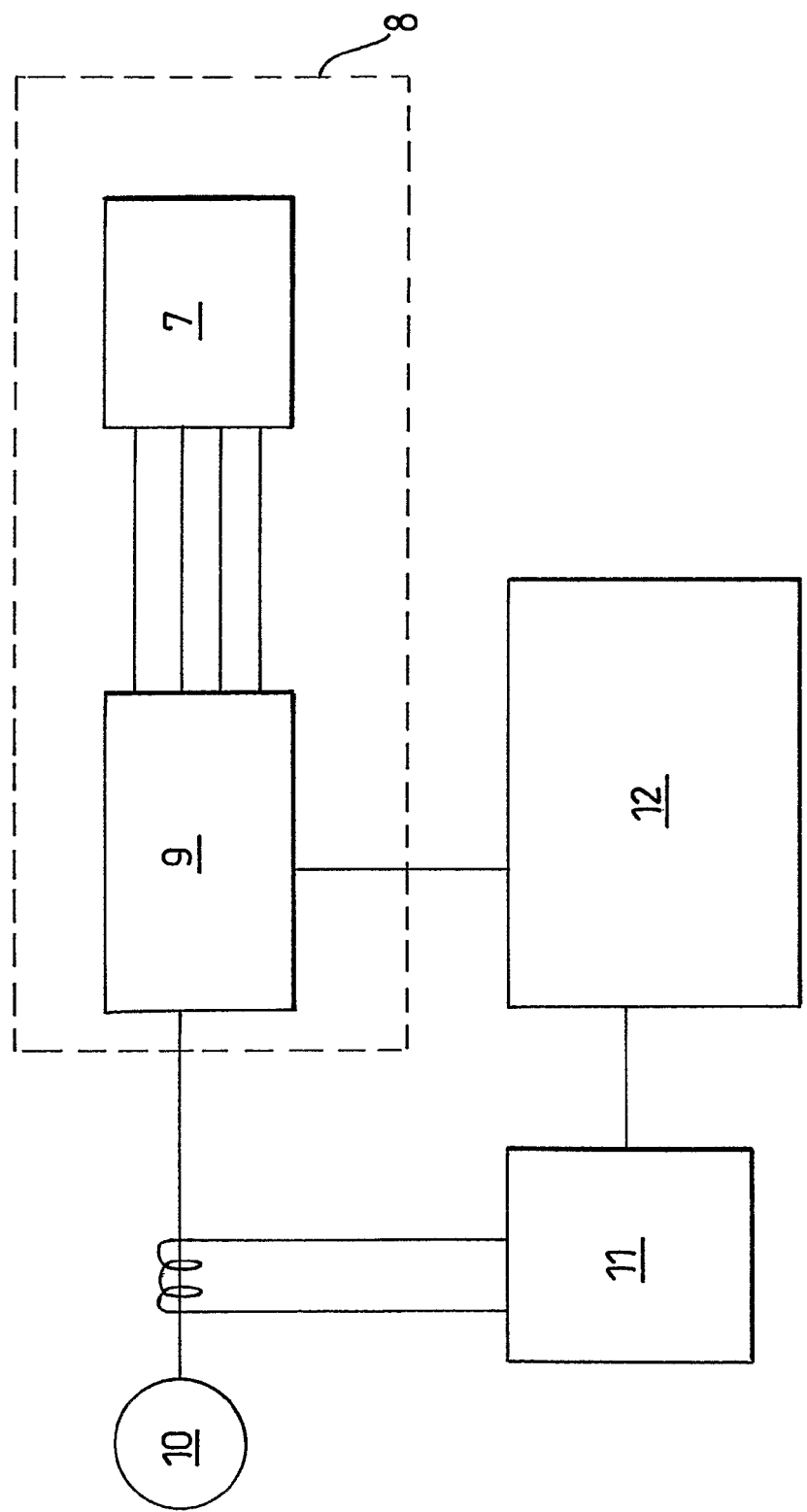
FIG. 3 is a schematic diagram of apparatus for generating a control map for the motor of FIG. 1.

A schematic diagram of apparatus suitable for generating a control map according to the invention is shown in FIG. 3. The motor is indicated generally by the reference numeral 7 and is located in a motor bucket 8, together with an electrical control board 9. The arrangement includes a voltage source 10 in the form of a DC power supply that can be either a battery or rectified and filtered AC mains. The DC voltage provided by the power supply 10 is supplied across a DC link and switched across phase windings of the motor 7 by the electronic control board 9. In the present application, the DC voltage provided to the switched reluctance machine (whether from a battery, rectifier or otherwise) is referred to as the "DC link voltage".

The control board 9 is connected to each of the phase windings of the motor 7, and controls operation of the motor by causing the phase windings to be energised in sequence. A power meter 11 is connected to the DC link to measure the input power. Signals from the power meter 11 are input to a test controller 12 which, in turn, sends data to the electronic control board 9.

Figure 4:
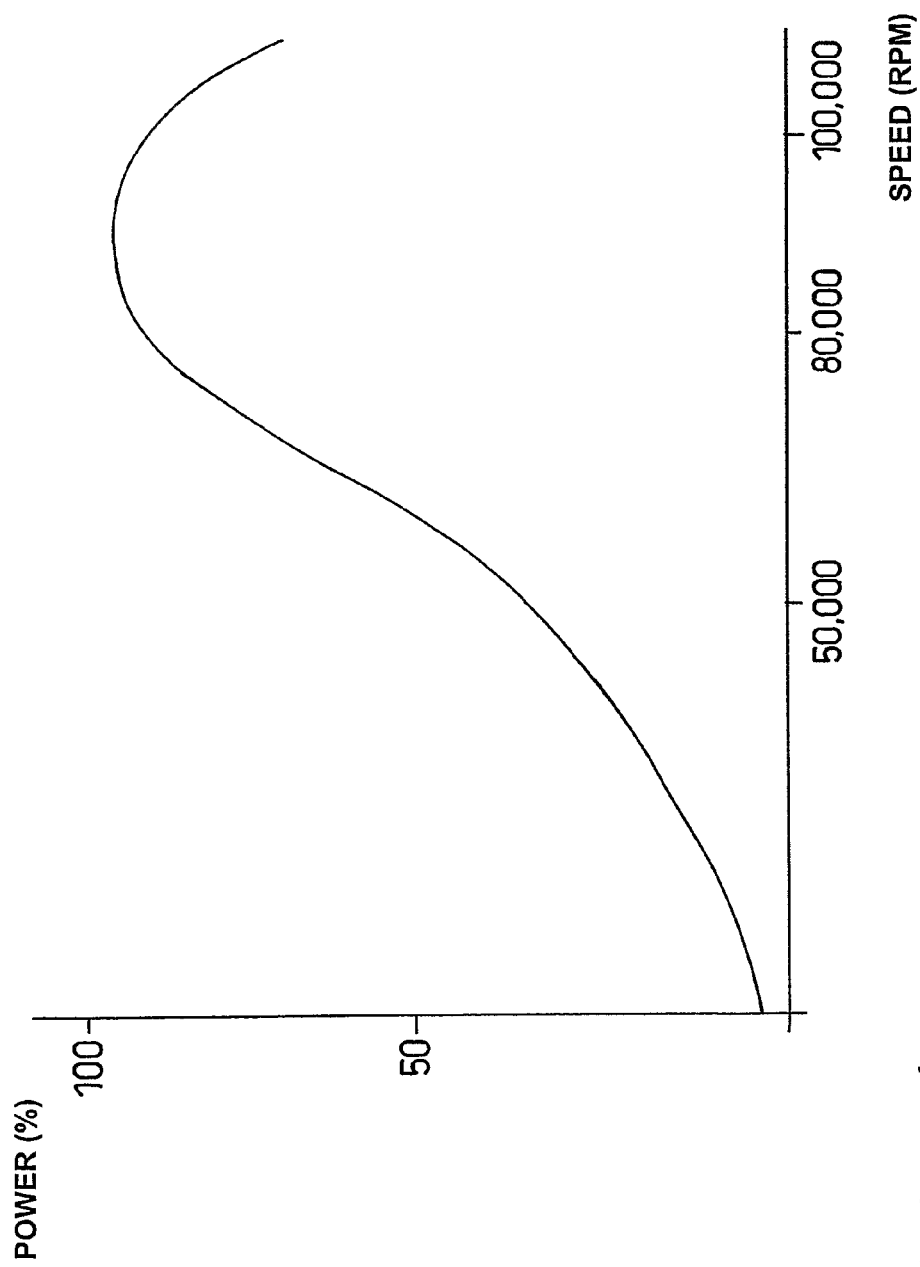
FIG. 4 illustrates a graph of desired input power over a range of operating speeds of the motor of FIG. 1.

FIG. 4 shows a desired input power profile over a wide range of operating speeds. Such a profile may predetermined by means of modelling software, and may be generated for a specific application of the motor. For example, the profile of FIG. 4 has been generated for a vacuum cleaner motor. This profile shows the power increasing steadily with speed until maximum power is achieved at very high speeds of between eighty thousand and one hundred thousand rpm. At speeds above this limit, the motor is arranged to power-down to avoid excessive wear to the components.

Figure 5:
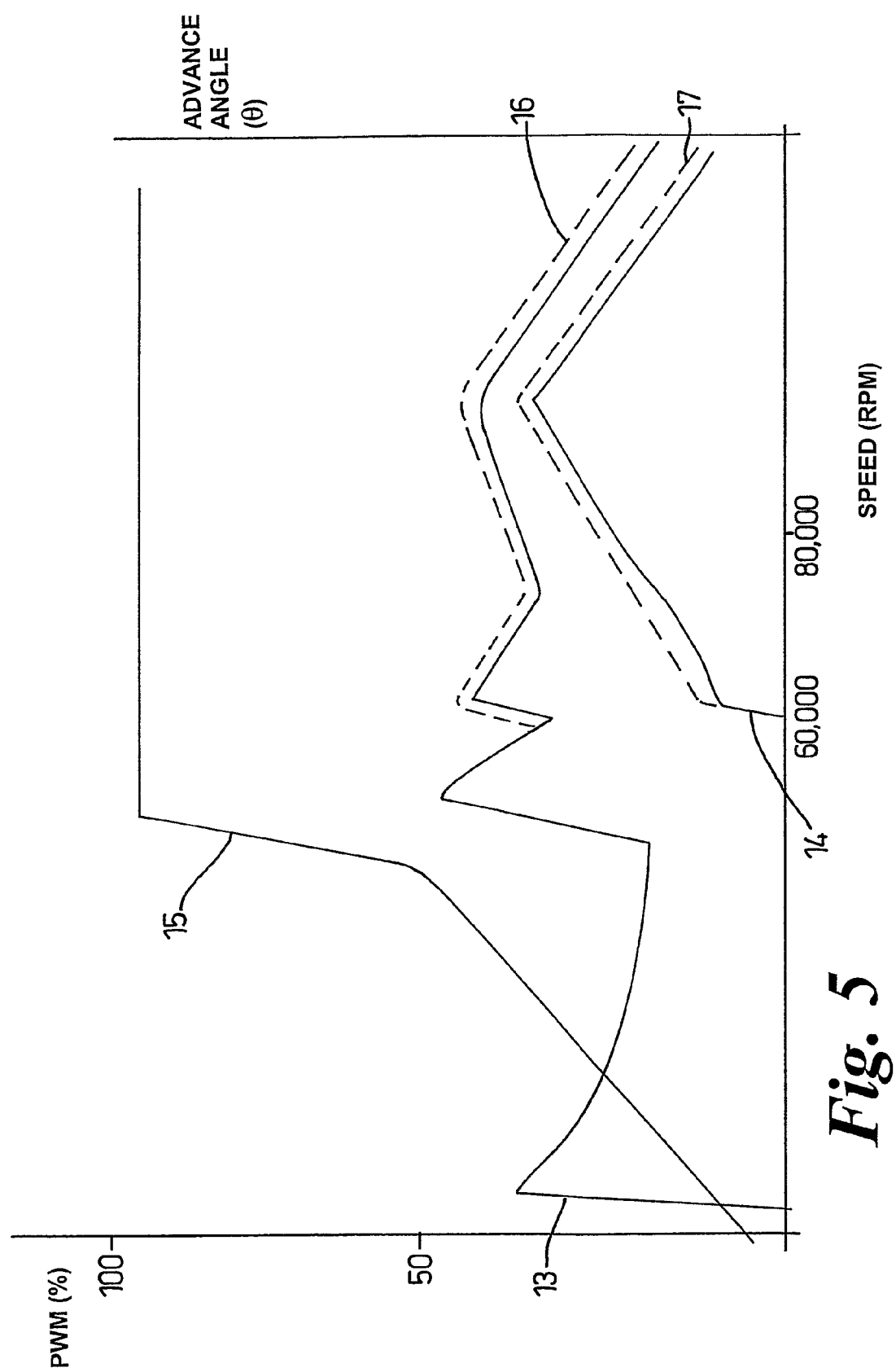
FIG. 5 illustrates a control map for controlling the motor of FIG. 1.

FIG. 5 shows a corresponding predetermined profile in the form of a nominal advance angle map. This profile represents an idealised operating condition. The line indicated by the reference numeral 13 shows the variance of the off-advance angle with increasing speed of the rotor. The line indicated by the reference numeral 14 shows the relationship between the on-advance angle with rotor speed. The on-advance angle does not vary at all until the motor has reached speeds in excess of 60,000 rpm. At lower speeds, energising of the windings is mainly controlled by PWM. The line 15 on the graph indicates PWM control, and shows the percentage of each cycle during which voltage is applied to the phase windings. At slow speeds of, for example, five thousand rpm, a voltage pulse is applied for only approximately 10% of the duty cycle. The voltage pulse widths increase as the speed increases until at around fifty thousand rpm, full width voltage pulses are applied to the windings.

In order to generate the control map, the voltage supply 10 is arranged to supply a constant voltage to the motor 7 via the electronic control board 9. The value of the applied constant voltage is selected to correspond with a typical operating voltage that would be supplied to the machine via the DC link in use. In the present example of a motor for a vacuum cleaner, the constant voltage is selected to represent the voltage of a typical domestic mains supply, for example, 230V.

A speed is selected that corresponds to a predetermined input power from the power speed profile. A convenient speed in this example would be 80,000 rpm, because it is known that the motor should be operating at full power at that speed. The control board 9 is arranged to apply voltage pulses to the windings in accordance with the nominal advance angle profile of FIG. 5, in order to bring the rotor up to speed. The pulses are applied according to the on-advance angle and off-advance angle stored in the nominal advance angle profile.

The power meter 11 measures the input power and sends this as a signal to the test controller 12. The controller 12 compares the measured input power with the desired input power indicated by the power profile of FIG. 4. If there is a discrepancy, the test controller applies an incremental change in both the on-advance angle and the off-advance angle, and the input power is measured again. Again, if there is a discrepancy between the measured input power and the desired input power, the on- and off-advance angles are altered by another increment. A typical incremental angular change is of the order of 0.7°. This process is continued until the measured input power and the desired input power are substantially the same. When this is achieved, the total change in advance angle is stored in the memory as a correction factor. In use, this correction factor is employed over a predetermined portion of the nominal advance angle profile, preferably the portion during which the on-advance angle comes into play. The advance angle profiles with a typical correction factor taken into account are represented by the broken lines in FIG. 5. The off-advance angle with the correction factor added to it is indicated by the line 16. The on-advance angle with the correction factor added to it is indicated by the line 17

Alternatively, the advance angles may be amended incrementally until the measured input power is within a range of values with respect to the predetermined input power.

The nominal advance angle profile and the correction factor are held permanently in locations in a non-volatile memory associated with the control board. The amount of data stored is typically the equivalent of one row of data in the prior art control map consisting of look-up tables. Thus, the control map allows a smaller memory to be used, thereby reducing the cost of the machine. Alternatively, the extra, unused memory may be utilised for other applications.

Figure 6:
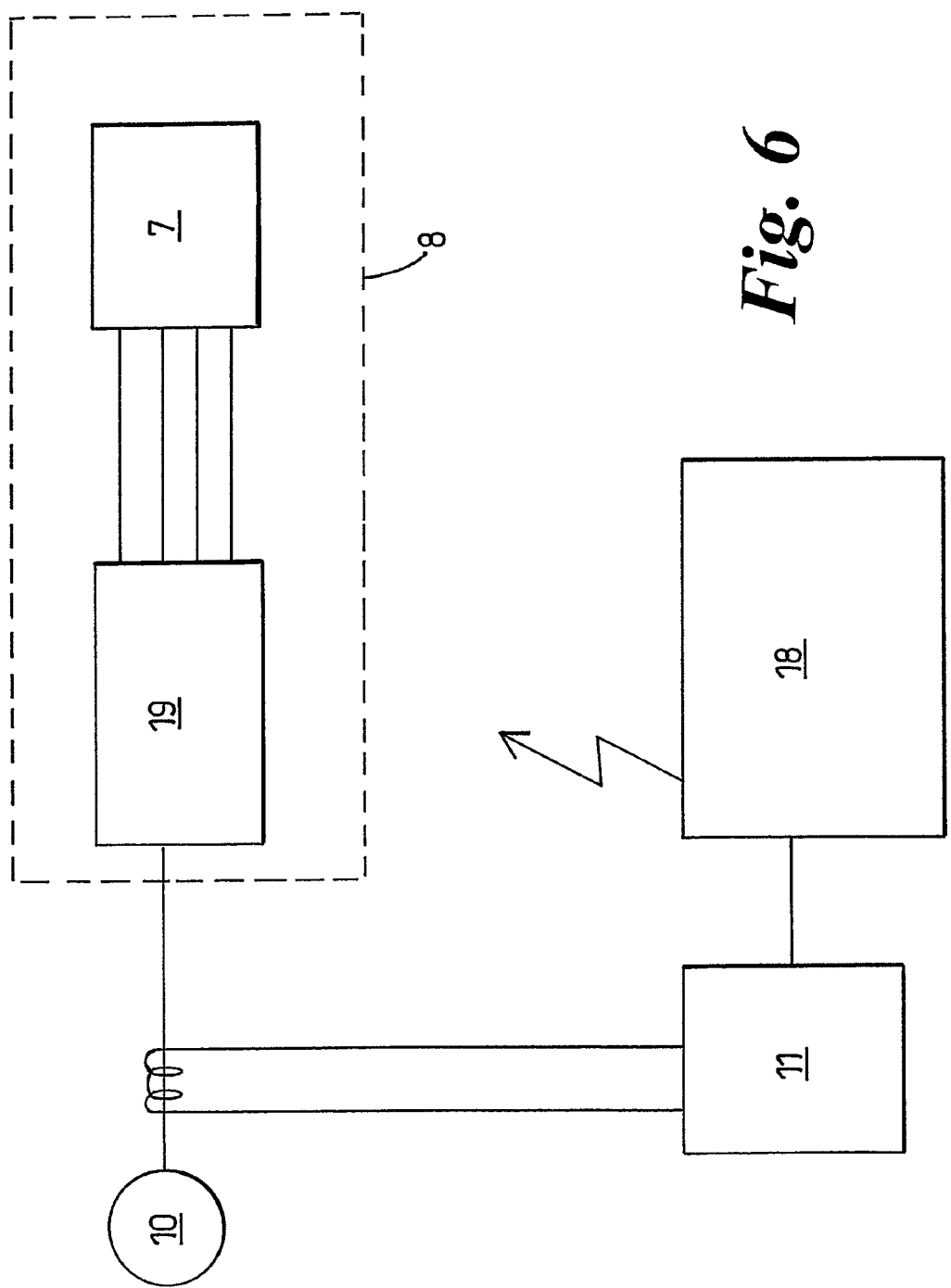
FIG. 6 is a schematic diagram of alternative apparatus for generating a control map for the motor of FIG. 1.

A further alternative is illustrated schematically in FIG. 6. In this arrangement, the test controller 18 is arranged to communicate with the control board 19 by means of a radio frequency (rf) transmitter. In this embodiment, the correction factor is transmitted to the memory of the control board 19 by means of rf signals. This arrangement advantageously removes the need for a physical electrical connection between the test controller and the control board, which is hidden within the motor bucket 8.

Voltage Compensation

The aforedescribed control map, in common with prior art control maps assumes that the voltage applied to the windings is constant. However, in use, the DC link voltage varies from the voltage at which the control map was derived.

Figure 7:
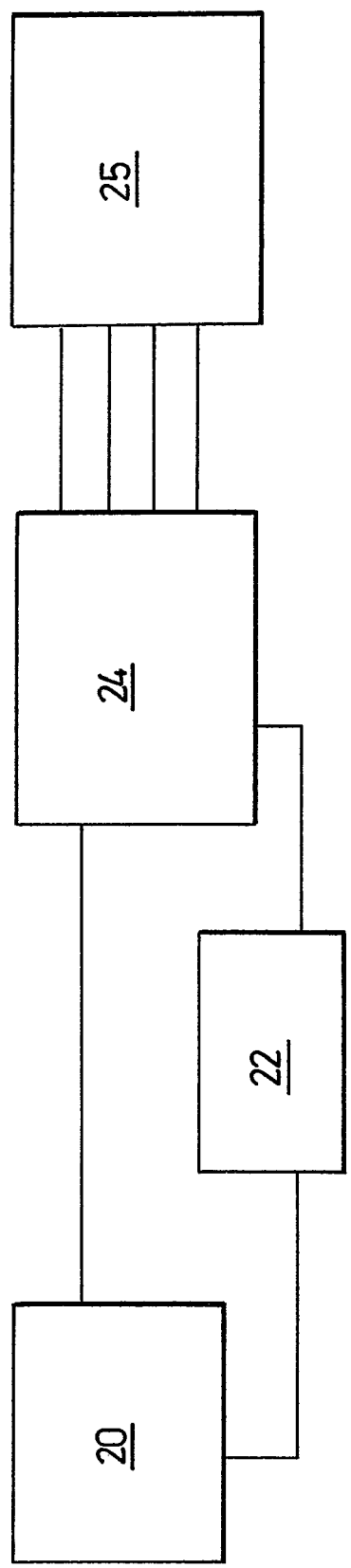
FIG. 7 schematically shows the motor of FIG. 1 and a control circuit.
Figure 8:
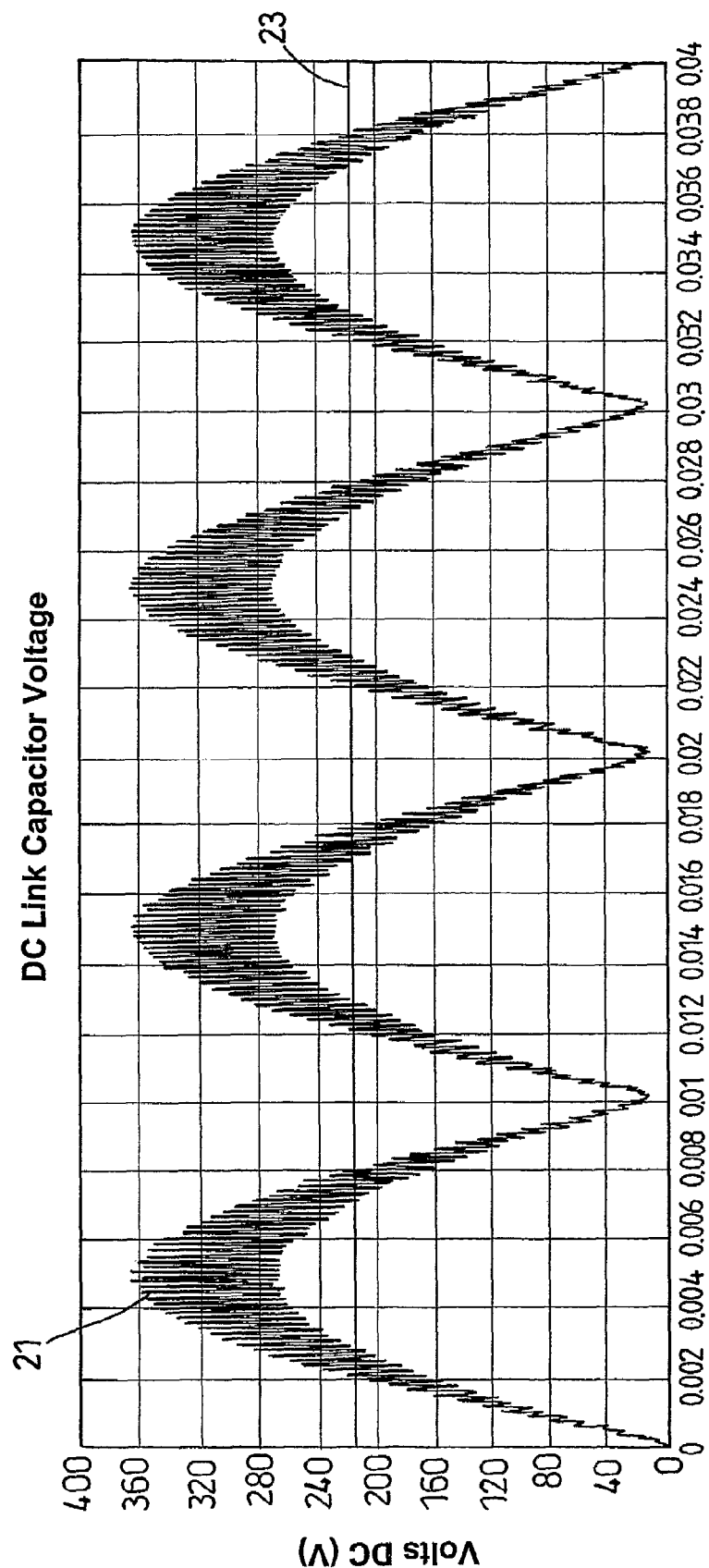
FIG. 8 shows a typical wave form of the DC link voltage.
Figure 9:
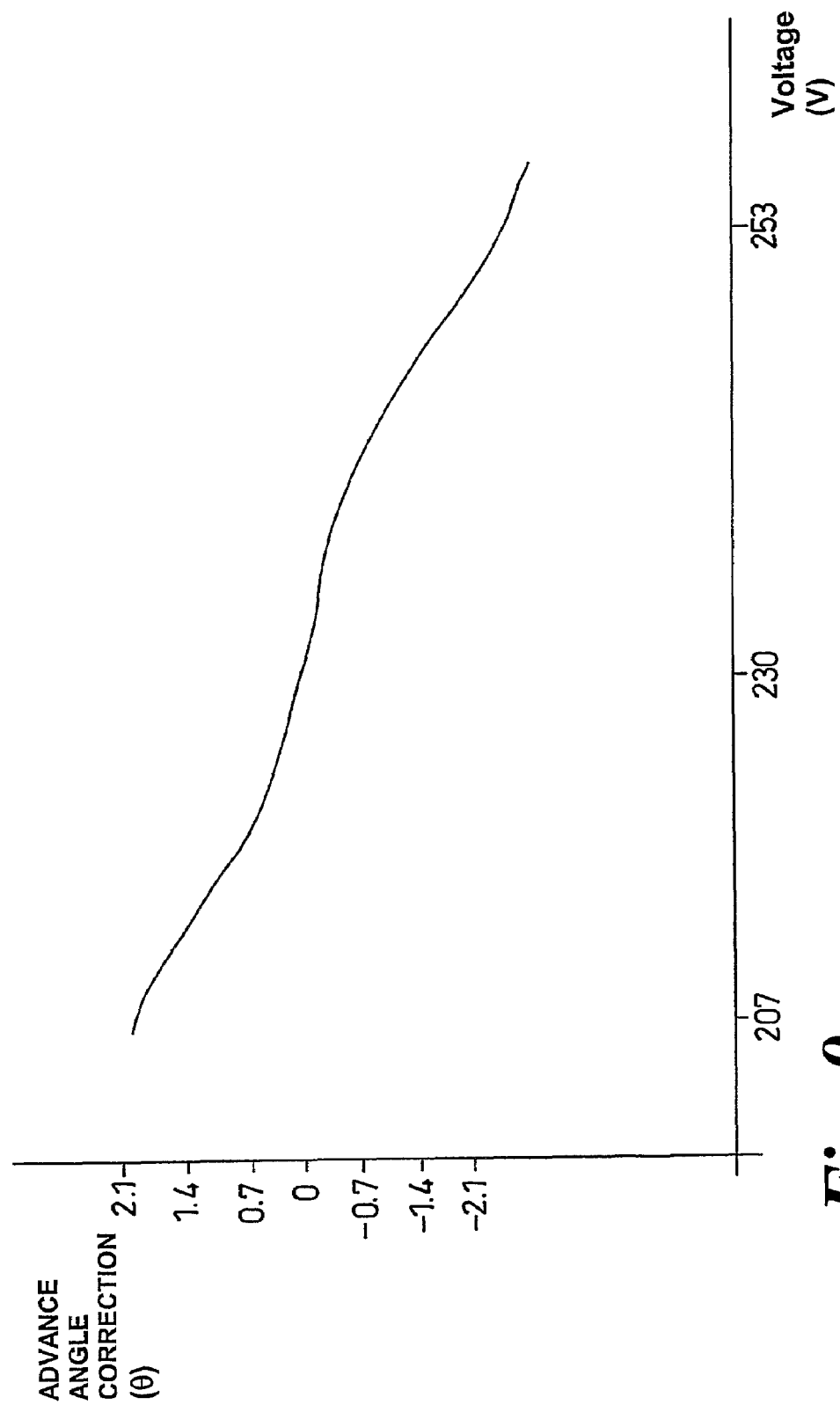
FIG. 9 illustrates a relationship between the applied DC link voltage and a correction to the angular position of the rotor at which the phase windings are energised.

FIGS. 7 to 9 inclusive illustrate a method of compensating for a varying DC link voltage.

FIG. 7 is a simplified schematic diagram showing a switched reluctance motor 25 in use. In this drawing, power conversion apparatus is indicated generally by the reference numeral 20. In use, the power conversion apparatus 20 is connected to the mains power supply and is arranged to provide a filtered and rectified DC link voltage. Suitable power conversion apparatus is described in our co-pending patent application GB0229873.5.

An example of an actual DC link voltage is shown by the line 21 in FIG. 8. The voltage signal fluctuates rapidly with time. The DC link voltage is sampled at the filter circuit 22 of FIG. 7, in order to provide a smoothed average value of the DC link voltage. A typical average DC link voltage is indicated at 23 in FIG. 8. This average DC link value is supplied to the controller 24, in which is stored a voltage compensation map, such as that shown in FIG. 9.

This map charts the relationship between advance angle and the average DC link voltage. The map may be derived by experiment or otherwise generated by means of modelling software. The map is held permanently in a non-volatile memory associated with the controller 24. In this example, the advance angle is zero at 230V. This is because the control map was derived whilst applying constant voltage pulses to the windings of 230V. Thus, the control map gives accurate control of the motor at that voltage. In this example, the advance angle is arranged to reduce as the DC link voltage increases, and vice versa.

When the DC link voltage is sampled from the filter, the controller 24 addresses the voltage relationship held in the memory, in order to derive a correction factor to be applied to the advance angles at which the phases are fired. For example, if the measured DC link voltage is 207V, then the controller applies an advance angle correction of to both the on and off advance angles of 2.1°. Thus, the firing of the phases is controlled in a simple manner and reduces the need for sensors for measuring characteristics of the motor e.g. torque, speed.

The relationship between voltage and angle correction need not be stored in the form of the map of FIG. 9. If, for example, the relationship is a linear one, it would be within the capabilities of the skilled person to cause the controller to apply a predetermined correction factor to the advance angle for every volt, or fraction of a volt, by which the applied DC link voltage is shifted.

The aforedescribed method of voltage compensation may be applied continuously, periodically, or simply at a predetermined event, such as on starting the motor.

It has been found that, when the motor is connected to the power supply, but is not being run, the DC link voltage is generally higher than would otherwise be expected, because current is not being drawn from the circuit. Thus, a correction factor may be stored purely to correct firing angles at start-up of the motor. This may be effected simply by shifting the angle compensation factor by a predetermined voltage value. For example, on start-up, a DC link voltage of 315V may have a corresponding advance angle adjustment of 1.4°.

A further enhancement is the application of hysteresis control. If the measured DC link voltage fluctuates rapidly between two values, the advance angle correction factor will tend to fluctuate accordingly. The controller may be arranged such that the change in voltage has to be greater than a predetermined increment before the controller applies a new value for the advance angle correction, so that the change of advance angle lags behind the change in voltage. For example, if the DC link voltage rises from 230V to 232V, the controller may be configured to wait until the voltage has risen to 234V before applying a correction to the advance angle.

The invention is applicable to switched reluctance machines, and is particularly useful in such machines that operate at high speeds of, say, 100,000 revolutions per minute.

Figure 10:
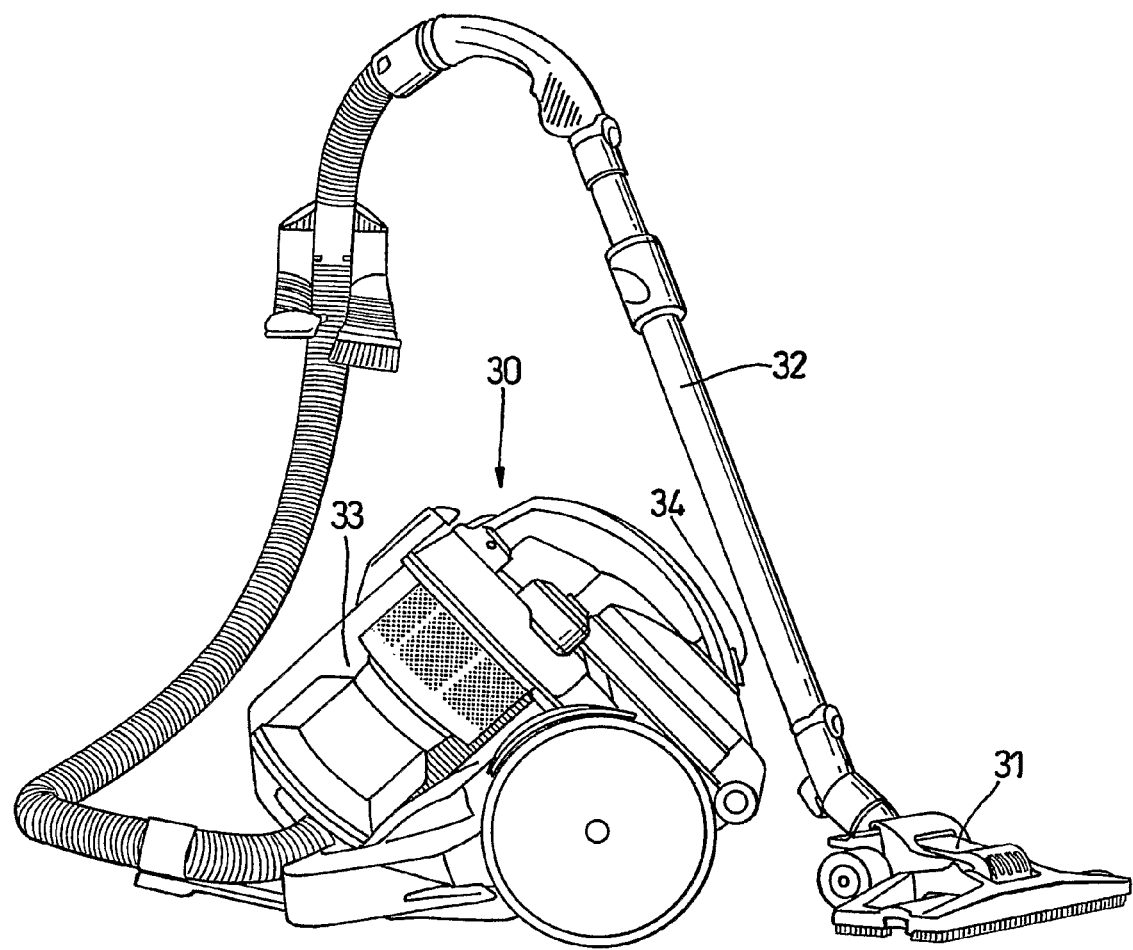
FIG. 10 shows a cleaning appliance in the form of a cyclonic vacuum cleaner incorporating the motor of FIG. 1.

FIG. 10 shows one example of a vacuum cleaner 30 in which the switched reluctance motor may be used. The motor is arranged to drive an impeller at very high speed. The pumping action of the impeller draws dirty air into the cleaner via a nozzle 31 and a hose and wand assembly 32. The dirty air enters a separator 33, which serves to separate dirt and dust from the dirty air. The separator 33 can be a cyclonic separator, as shown here, or some other separator, such as a dust bag. Cleaned air leaves the separator 33 before entering the motor housing located within the main body 34 of the cleaner. A pre-motor filter is typically placed in the airflow path before the impeller to filter any fine dust particles that were not separated by separator 33. A post-motor filter may be placed in the airflow path. However, the provision of a brushless motor reduces the requirement for such a filter. The cleaned air is then exhausted from the cleaner to the atmosphere via a suitable outlet.

Variations to the described embodiments will be apparent to a skilled person and are intended to fall within the scope of the invention. For example, while a four-pole stator, two-pole rotor machine has been described, the invention can be equally applied to machines having other numbers of poles on its stator and rotor and with motors having other dimensions.

The invention is equally applicable to motors and generators, not necessarily of the switched reluctance type, and may be employed in appliances other than domestic vacuum cleaners, such as lawn mowers, air conditioners, hand dryers and water pumps.

The invention claimed is:

1. A method of compensating for differences between an applied DC link voltage and a predetermined DC link voltage in an electrical machine comprising a rotor, at least one phase winding, and a controller configured to energize the phase winding in dependence on an angular position of the rotor, wherein the controller comprises a memory storing a voltage compensation map comprising a plurality of correction factors, the method comprising:

measuring the applied DC link voltage;

obtaining a correction factor by addressing the voltage compensation map using the applied DC link voltage; and applying the obtained correction factor to the angular position of energization of the phase winding.

2. A method as claimed in claim 1, in which the applied DC link voltage is measured periodically.

3. A method as claimed in claim 1, in which the applied DC link voltage is measured when the machine is started.

4. A method as claimed in claim 1, further comprising measuring the applied DC link voltage when the machine is connected to a power supply but before the machine is switched on and applying the obtained correction factor to the angular position of energization of the phase winding on starting the machine.

5. A method as claimed in claim 4, further comprising deriving an average value for the applied DC link voltage at the measurement.

6. A method of controlling an electrical machine, including the method of compensating for differences between the applied DC link voltage and a predetermined DC link voltage as claimed in claim 4.

7. A method as claimed in claim 1, further comprising deriving an average value for the applied DC link voltage at the measurement.

8. A method as claimed in claim 7, in which the step of deriving the average value includes applying a filter to the applied DC link voltage.

9. A method of controlling an electrical machine, including the method of compensating for differences between an applied DC link voltage and a predetermined DC link voltage as claimed in claim 1.

10. A controller for an electrical machine, wherein the electrical machine comprises a rotor and at least one phase winding and the controller comprises a memory storing a voltage compensation map comprising a plurality of correction factors, the controller being configured to:

energize the phase winding in dependence on an angular position of the rotor;

obtain a correction factor by addressing the voltage compensation map using a value of an applied DC link voltage; and apply the obtained correction factor to the angular position of energization of the phase winding.

11. A controller as claimed in claim 10, in which the memory comprises a predetermined advance angle map representing the energization of the phase winding with respect to the angular position of the rotor over a range of rotor speeds.

12. A controller as claimed in claim 11, in which the memory further comprises an angle correction factor to be applied to a predetermined portion of the predetermined advance angle map, which correction factor relates to the difference between the measured input power and a predetermined power.

13. An electrical machine incorporating a controller as claimed in any one of claims 10, 11, and 12.

14. An electrical machine as claimed in claim 13, in the form of a switched reluctance motor.

15. A cleaning appliance comprising the switched reluctance motor of claim 14.

16. A cleaning appliance incorporating an electrical machine as claimed in claim 13.

\* \* \* \* \*